United States Patent
Birnbaum et al.

(10) Patent No.: US 9,568,216 B2
(45) Date of Patent: Feb. 14, 2017

(54) METHOD FOR OPERATING A DIRECTLY HEATED, SOLAR-THERMAL STEAM GENERATOR

(75) Inventors: Jürgen Birnbaum, Nürnberg (DE); Joachim Brodesser, Nürnberg (DE); Jan Brückner, Uttenreuth (DE); Martin Effert, Erlangen (DE); Joachim Franke, Nürnberg (DE); Gerhard Schlund, Dormitz (DE); Tobias Schulze, Erlangen (DE); Frank Thomas, Erlangen (DE); Gerhard Zimmermann, Höchstadt/Aisch (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 416 days.

(21) Appl. No.: 13/985,974

(22) PCT Filed: Feb. 3, 2012

(86) PCT No.: PCT/EP2012/051834
§ 371 (c)(1),
(2), (4) Date: Oct. 16, 2013

(87) PCT Pub. No.: WO2012/110328
PCT Pub. Date: Aug. 23, 2012

(65) Prior Publication Data
US 2014/0034044 A1 Feb. 6, 2014

(30) Foreign Application Priority Data

Feb. 17, 2011 (DE) .................. 10 2011 004 277

(51) Int. Cl.
F22B 37/38 (2006.01)
F24J 2/40 (2006.01)
(Continued)

(52) U.S. Cl.
CPC ................. *F24J 2/40* (2013.01); *F22B 1/006* (2013.01); *F22B 35/007* (2013.01); *F22B 35/10* (2013.01);
(Continued)

(58) Field of Classification Search
CPC ................................ F22B 37/38; F22B 1/006
See application file for complete search history.

(56) References Cited

U.S. PATENT DOCUMENTS 4,551,796 A * 11/1985 Singh .................... F22B 35/004
290/40 C
5,529,021 A * 6/1996 Butterlin ................. F22B 35/10
122/448.1
(Continued)

FOREIGN PATENT DOCUMENTS

CN 201680347 U 12/2010
CN 201705599 U 1/2011
(Continued)

*Primary Examiner* — David J Laux

(57) ABSTRACT

A method for operating a directly heated, solar-thermal steam generator is provided. As per the method, a nominal value $\dot{M}_s$ for the supply water mass flow $\dot{M}$ is conducted to an apparatus for adjusting the supply water mass flow $\dot{M}$ wherein, at the adjustment of the nominal value $\dot{M}_s$ for the supply water mass flow $\dot{M}$, account is taken of a correction value $K_T$, by which the thermal effects of storage or withdrawal of thermal energy in an evaporator are corrected.

8 Claims, 4 Drawing Sheets

(51) Int. Cl.
    *F22B 35/10*     (2006.01)
    *F22D 5/00*     (2006.01)
    *F22B 1/00*     (2006.01)
    *F24J 2/12*     (2006.01)
    *F22B 35/00*     (2006.01)

(52) U.S. Cl.
    CPC ............... *F22B 37/38* (2013.01); *F22D 5/00* (2013.01); *F24J 2/12* (2013.01)

(56) References Cited

U.S. PATENT DOCUMENTS

| | | | |
|---|---|---|---|
| 2003/0024686 A1* | 2/2003 | Ouellette | C05F 17/0063 165/47 |
| 2008/0066695 A1* | 3/2008 | Butterlin | F22B 35/10 122/406.1 |
| 2010/0288210 A1 | 11/2010 | Brueckner | |

FOREIGN PATENT DOCUMENTS

| | | |
|---|---|---|
| DE | 102010040210 A1 | 3/2012 |
| EP | 2194320 A1 | 6/2010 |
| WO | WO 9747921 A1 | 12/1997 |

* cited by examiner

METHOD FOR OPERATING A DIRECTLY HEATED, SOLAR-THERMAL STEAM GENERATOR

CROSS REFERENCE TO RELATED APPLICATIONS

This application is the US National Stage of International Application No. PCT/EP2012/051834 filed Feb. 3, 2012 and claims benefit thereof, the entire content of which is hereby incorporated herein by reference. The International Application claims priority to the German application No. 102011004277.6 DE filed Feb. 17, 2011, the entire contents of which is hereby incorporated herein by reference.

FIELD OF INVENTION

The invention relates to a method for operating a directly heated, solar-thermal steam generator, with which a nominal value $\dot{M}_s$ for the supply water mass flow $\dot{M}$ is fed to an apparatus for adjusting the supply water mass flow $\dot{M}$. It further relates to a directly heated solar-thermal steam generator with an apparatus for adjusting the supply water mass flow $\dot{M}$, and a solar-thermal parabolic trough power plant with a directly heated, solar-thermal steam generator.

BACKGROUND OF INVENTION

The constantly increasing demand for energy and climate change must be met by the use of sustained energy sources. Solar energy is such a sustained energy source. It is climate-friendly, available in inexhaustible quantities, and does not represent a burden for subsequent generations.

Solar-thermal power plants represent an alternative to conventional power generation. At the present time, solar-thermal power plants are operated with parabolic trough collectors and indirect evaporation. Direct evaporation in parabolic trough collectors or Fresnel collectors represents a future option. A solar-thermal power plant with parabolic trough collectors or Fresnel collectors and direct evaporation consists of a solar field in which the supply water is preheated, evaporated, and superheated, and of a conventional power plant part, in which the thermal energy of the steam is converted into electrical energy.

In non-stationary operation (e.g. load change), with forced-flow parabolic trough collectors or Fresnel collectors with direct evaporation, the evaporator flow must be changed as synchronously as possible into the heat input into the evaporator heating surface. The nominal value control of the supply water flow regulation provides the necessary supply water nominal values as a function of the state of the installation, in start-up and low-load operation as well as in forced-flow operation. With non-stationary behavior of the solar field it has the task of guaranteeing a desired evaporator output enthalpy on the flow medium side, and therefore impeding associated, in particular substantial, temperature fluctuations of the steam at the evaporator output, with all the overlaid effects incurred (e.g. live steam temperature fluctuations).

Changes in the heat input into the evaporator heating surface of the solar field and/or interferences in the evaporator input enthalpy, at a given flow rate, have a direct effect on the evaporator output enthalpy. An adjustment of the evaporator flow rate can only be carried out, in the fastest case, after a control deviation, which under certain circumstances, specifically for rapid load transient events (e.g. cloud passage), can be too sluggish to guarantee a fluctuation-free output temperature. Under these conditions, the regulation basically limps after the change in the solar-side heat supply. Serious disturbances in the thermodynamic state values (in particular, high temperature fluctuations in the water-steam circuit of the solar field) result.

In modern parabolic trough power plants with direct evaporation, the evaporator is overfed. By means of an appropriate apparatus (water-steam separator), the surplus water at the evaporator output which has not yet been evaporated is separated from the steam. The steam flows into the downstream superheater collectors. The surplus water is either collected in the separator itself or in a downstream container (water collection vessel), then, in the further course of the process, is discharged through a purge hardware, and, in the best-case scenario, is mixed back into the main flow again at the evaporator input (recycled).

Under these preconditions, in order to control the necessary evaporator throughflow, use is usually made of what is referred to as a three-component control system, which, as a function of the generated steam mass flow, in the best-case scenario refills precisely the same quantity of supply water. A correction regulator which, for example, regulates the water level in the water collection vessel, corrects the supply water quantity determined in this way in the event of the actual water level deviating from the specified nominal value (e.g. in the event of dynamic processes and in order to take account of necessary discharge mass flows during the purging process).

The advantage of this method lies in the low-fluctuation medium temperature at the evaporator output, since this corresponds to the saturation temperature. In addition to this, in comparison with a continuous concept with which, as a rule, superheated flow medium is present at the evaporator output, it is highly probable that a more stable flow form can be achieved, even if no additional flow-stabilizing measures are taken with regard to the continuous concept. However, because the evaporation end point is spatially fixed at the evaporator output, the advantage is lost of the operational flexibility of a forced-flow steam generator with variable evaporation end point, such as, for example, guaranteeing the most constant possible live steam temperatures over a wide load range. Under these circumstances, the demands on the live steam temperature control system increase. In addition, a reasonable control of the water level in the water collection vessel, specifically for rapid load transient events, can only be achieved with difficulty, or even not at all, due to the low volume of the water collection vessel and the long time delay behavior of the controlled system.

SUMMARY OF INVENTION

The object of the invention is to provide a method for operating a directly heated solar-thermal forced-flow steam generator which, in particular with non-stationary processes, is characterized by particularly high reliability and the quality of the controllability. In addition, a solar-thermal steam generator which is particularly well-suited to performing the method is to be specified.

The above objects are achieved by the features of the independent claim(s).

The invention is based on the consideration of applying a concept of a predictive or foreseeable mass flow control for a directly heated, solar-thermal steam generator in order to improve the control quality in the adjustment of the supply water mass flow $\dot{M}$. The core of the invention in this situation is, in the determination of a suitable nominal value $\dot{M}_s$ for the supply water mass flow $\dot{M}$, to take account consistently of notorious correction values. By taking account of a correction value $K_T$ it is possible for thermal storage effects to be compensated for, which occur in particular with non-stationary processes in the form of the storage and withdrawal of thermal energy.

The nature of the predictive supply water flow control allows for deviations in the specific enthalpy at the evaporator output from the nominal value, and resultant undesirably high temperature fluctuations to be kept as low as possible in all operational states of the steam generator, i.e. in particular also in cases of transient states or load changes. In this situation, in particular in the event of load changes, the necessary supply water nominal values are provided as a function of the present operational state or the operational state to be anticipated for the near future.

In an advantageous embodiment of the method, by means of the correction value $K_T$ the thermal storage effects are corrected by thermal energy stored in or withdrawn from the tube walls of the evaporator of the solar-thermal steam generator.

In a further advantageous embodiment of the method, with the adjustment of the nominal value $\dot{M}_s$, the total quantity of heat Q of the solar-thermal steam generator is taken into account. In this way a precontrolled calculation of the required supply water quantity, which is particularly well-suited to the demand and is based on the actual state of the system, is made possible on the basis of a heat flow balancing.

In a particularly advantageous further development of the method, a correction value $K_F$ is also taken into account for the adjustment of the nominal value $\dot{M}_s$, wherein, in a first approach, storage effects of the evaporator of the solar-thermal steam generator on the water-steam side or the flow medium side respectively are corrected by the correction value $K_F$.

If the supply water enters the solar collector field with a relatively high input under-cooling, the use of one or more solar collectors for the additional pre-heating of the supply water is conceivable (comparable with the economizer heating surfaces of typical fossil-fuel fired power plants). In these solar collectors, used as economizers, in the case of transient processes fluid-side storage input and output effects also occur. With a mass flow measuring point at the input of the solar collector field and a supply water controller which relates to this measuring point, the mass flow fluctuations resulting from the storage effects at the economizer output (or evaporator input respectively) take effect directly on the evaporator output enthalpy. Under these circumstances, evaporator flow and heat input into the heating surface no longer run in synchrony with one another, with the result that more or less severe enthalpy fluctuations at the evaporator output are to be reckoned on. It is therefore further advantageous that, in a second approach, by the correction value $K_F$, the quantities of supply water stored and withdrawn are additionally corrected in an economizer upstream of the evaporator.

In addition to this, the evaporator throughflow determined by the predictive supply water nominal value calculation can be additionally corrected by superimposed control circuits, such that the required enthalpy nominal value at the evaporator output can in fact also be permanently attained. For the correction control of the pre-calculated supply water mass flow, however, account must be taken of the fact that, for reasons of controller stability, this can only be carried out very slowly and with low controller amplification. Marked temporary deviations from the specified nominal value, incurred due to physical mechanisms as a result of the non-stationary operating mode of the heated solar-thermal steam generator, can only be reduced insubstantially, or not at all, by these correction control circuits. Accordingly, the predictive supply water nominal value determination is to be enhanced by additional means in such a way as to minimize the temporary deviations from the specified nominal value also during rapid transient events.

On the basis of this objective, in this particular further development of the method according to the invention, as well as the correction value $K_T$, account is taken by way of a correction value $K_F$ of fluid-side processes of storage and withdrawal inside the evaporator tubes and, as appropriate, inside the economizer tubes. By using both correction values $K_T$ and $K_F$, it is possible to react in a suitable manner to physical mechanisms which, in non-stationary operation, have a temporary effect on the throughflow of the evaporator, and therefore result in deviations in the actual enthalpy at the output of the evaporator from the specified nominal value.

With non-stationary processes, in the evaporator on the flow medium side, in general thermodynamic state values change, such as, for example, the evaporator output temperature, the pressure (for the sub-critical situation, therefore also the boiling temperature of the flow medium) and the evaporator input temperature. As a result of these changes, the material temperature of the evaporator tubes is also not constant, and becomes greater or smaller depending on the direction. As a consequence, thermal energy is stored into the tube walls of the evaporator, or withdrawn from the tube walls of the evaporator. Compared with the balanced total heat output Q, which is transferred by solar incidence onto the evaporator tubes, there is accordingly temporarily more or less heat available in the evaporator for the steam generating process, depending on the direction of the material temperature change. With a predetermined enthalpy nominal value at the output of the evaporator of the solar-thermal steam generator, therefore, for the advance calculation of the necessary supply water mass flow nominal value $\dot{M}_s$, this not insubstantial influence must necessarily be taken into account in the control concept.

By means of a differentiator element of the first order (DT1 element), this physical effect can be illustrated in terms of control technology. As the input signal of the differentiator element, a mean material temperature of all the evaporator tubes is to be defined and used. In this situation, for example, the mean material temperature can be determined by means of the values known from the process, the evaporator outlet temperature, system pressure, evaporator input temperature, and, if appropriate, also taking account of the maximum possible heat flow densities. If this mean material temperature now changes, and if the output of the differentiator element is multiplied by the mass of the whole of the evaporator tubes and the specific thermal capacity of the evaporator material, then the quantities of heat stored in or withdrawn from the tube wall can be quantified. By selecting a suitable time constant of this differentiator element, the temporal behavior of the described storage effects can be relatively precisely recreated, such that this additional effect, based on non-stationary processes, of taking of heat into and out of metal masses, can be calculated directly. This can be equally applied to sub-critical or above-critical systems.

As an alternative, a direct measurement of the material temperature at characteristic points of the evaporator tubes would also be conceivable. Under these circumstances, a change in the metal temperature could be taken directly into account. In this case, both the number of differentiator elements as well as their corresponding amplification factors (essentially the mass of the evaporator tubes) would be adapted to the number of metal temperature measurements. The advantage of this variant, which is more elaborate in terms of measurement technology, would result in a more precise determination of the quantity of heat stored and withdrawn.

With this quantity of heat, determined in this way, of the evaporator tubes stored and withdrawn, the correction value $K_T$ is known, which is to be drawn from the balanced total heat capacity Q for the determination of the supply water mass flow nominal value $\dot{M}_s$.

With the second correction value $K_F$, which engages correctively directly on the supply water mass flow nominal value $\dot{M}_s$, other interfering influences in the water-steam circuit of the solar-thermal steam generator, resulting due to a non-stationary operation, can also be effectively compensated. In this situation, depending on the system configuration, a distinction can in principle be drawn between two different effects.

If changes occur in the thermodynamic state values, such as, for example, pressure and temperature, changes in terms of specific volume and density of the flow medium will then inevitably be linked to this, in each collector heating surface. For example, if, due to a load change, the specific volume of the flow medium in the entire evaporator heating surface decreases (density increases), this can temporarily accommodate more fluid (store mass). Consequently, markedly different mass flows occur at the input and output, which, with associated heating, results directly in a fluctuating evaporator output enthalpy. In order to reduce these fluctuations, the fluid-side mass storage effects arising are effectively compensated by the supply water nominal value determination.

The density distribution in the evaporator tube is decisively characterized by the start of evaporation. This is very closely linked to the evaporator input under-cooling. If evaporation first begins in the evaporator tube, then the mixture density is very substantially reduced downstream. If, as a result of transient processes, the input under-cooling now changes, then simultaneously the start of evaporation will shift, and therefore the entire density distribution in the tube. Mass storage and withdrawal effects thus result.

In this situation, rising input under-cooling values result in the short term in an increase in the evaporator output enthalpy. This can be explained by the fact that with the rising input under-cooling, the start of evaporation shifts in the direction of the evaporator output (the evaporator is fed with colder fluid). As a result of the local density increases (in particular in the region of the offset of the start of evaporation), fluid will be stored increasingly, and, conversely, the output mass flow will be reduced, which, directly with associated heating, must result in an increased evaporator output enthalpy. With a reduction in the evaporator input under-cooling, the inverse process ensues.

If an additional differentiator element of the first order is used in the supply water nominal value determination, then, with the selection of a suitable input signal (for example, the input under-cooling, the evaporator input temperature, or the evaporator input enthalpy), a suitable time constant, and a suitable amplification, the enthalpy fluctuations at the evaporator output will be effectively reduced.

If the supply water enters the solar collector field with a relatively high input under-cooling (supply water pre-heating due to the turbine tapping is low), then the use of one or more solar collectors for the additional pre-heating of the supply water is conceivable (comparable to the economizer heating surfaces of typical fossil fuel-fired power plants). A shift in the water-side pressure and temperature measurement (for the determination of the evaporator input enthalpy) from the input of the solar collector field behind the "economizer collector heating surfaces" is to be striven for in this case, in order to improve the supply water throughflow control. As well as greater stability of the control, this measure also contributes to improving the control quality. A measuring point with adequate input under-cooling must, however, again be guaranteed.

In the event of transient events, fluid-side storage and withdrawal effects also occur in these solar collectors, used as economizers. With a mass flow measuring point at the input of the solar collector field and a supply water controller which relates to this measuring point, the mass flow fluctuations resulting from the storage effects have a direct effect at the economizer output (or evaporator input respectively) on the evaporator output enthalpy. Under these circumstances, evaporator throughflow and heat input into the heating surface do not run synchronously, with the result that, again, more or less marked enthalpy fluctuations at the evaporator output are to be reckoned on.

By way of additional measurements of temperature and pressure at the input of the first and output of the last economizer collector heating surface, the fluid densities can be determined at these points. By means of a suitable conversion calculation, a representative density mean value can be determined. A change in this density mean value is therefore inevitably an indicator of fluid-side storage and withdrawal effects, which can be quantitatively assessed by a further differentiator element of the first order. If a suitable amplification (preferentially the complete volume of the economizer collector tubes) and a suitable time constant (preferentially half the cycle time of the flow medium through the economizer collector tubes (load-dependent!) are selected for this differentiator element, then the correction signal thus generated will optimally compensate for the fluid-side storage effects in the economizer.

The correction value $K_f$ is now derived, depending on the system configuration (with or without economizer heating surfaces), either from the determination alone of the fluid-side stored or withdrawn fluid quantities in the evaporator, or from the sum of the fluid-side stored or withdrawn fluid quantities in the evaporator and the economizer.

In a preferred embodiment according to the invention, the solar-thermal steam generator is integrated into a solar-thermal parabolic trough power plant with a number of parabolic troughs with direct evaporation. If the supply water nominal value determination according to the invention is used in solar-thermal steam generators with direct evaporation, then live steam temperatures can also be assured even for highly non-stationary operational states, such as frequently occur in solar-heated power plants (e.g. cloud passage). In addition to a manner of operation which is accordingly more reliable under changing weather conditions, a material-conserving concept can improve the availability of the entire power plant installation. In addition to this, the concept according to the invention is also well-suited for modular use in several solar-heated steam generators of one individual parabolic trough power plant. Additionally, the concept can also be used without any significant modifications in combination with other components, such as, for example, injection coolers.

The particular advantage of the supply water flow control concept according to the invention lies in its high operational flexibility. Depending on the relative distribution of the total heat onto the different parabolic trough collectors, it is possible, in forced-flow operation, by the selection of a suitable enthalpy nominal value at the evaporator output of the solar-thermal generator, for the live steam temperature control in particular to be kept at an optimum operating point. If the superheater collectors have a very low heat absorption, for example (e.g. cloud passage), then, by selecting a higher enthalpy nominal value at the evaporator output, a not inconsiderable portion of the evaporator can be used for the superheating of the flow medium, and therefore as a superheater. It is also possible, without any significant reduction in the injection quantity, for the live steam temperature to be kept constant under these conditions, such that the action radius of the live steam temperature control can remain for new dynamic demands.

By contrast, if the relative heat absorption shifts more in the direction of superheater collectors, because the evaporator collectors lie wholly or in part in a shadow, then, as a consequence, the enthalpy nominal value at the evaporator output is to be reduced. Consequently, the flow medium enters the superheater collectors colder, which again has a supportive effect on the live steam temperature control. It is even conceivable that in this case, with an appropriate oversupply of the evaporator, the residual evaporation of the flow medium could take place in the highly heated superheater collectors. The surplus water at the evaporator output would not be separated under these conditions, but would have to be forwarded with the steam into the downstream superheater collectors.

Specifically for the extreme limit case that the evaporator collectors are completely in the shadow of a cloud, and the superheater collectors are exposed to maximum solar radiation, it would be possible, as a result of the flexible evaporation end point, which in this case would not be spatially limited to the field of the evaporator collectors, for the live steam temperature control to be again held in its control range. Over-dimensioning of the injection cooler is not necessary under these conditions. Additionally, despite unfavorable peripheral conditions, the system can be operated with a high degree of efficiency. A precondition for this, however, is a suitable separator design, which will allow for an oversupply of the separator but without any effects worth mentioning on the remainder of the steam circuit.

In addition to this, with the present invention there is the possibility of modular control of individual collector lines. Since in a solar-thermal power plant with parabolic trough collectors or Fresnel collectors respectively, the number of parallel collector lines is limited to an overviewable number, it would be possible for the supply water flow quantity of each individual line to be controlled individually by the concept described, such that an equivalent control concept exists for each line. The live steam generated from each individual line would be gathered together in one steam "busbar" at an appropriate pressure level, and provided to the turbine for expansion. Under these conditions, each individual line, in accordance with the provision of heat from the sun, generates the maximum possible volume of steam at the desired live steam temperature, and therefore with the greatest possible degree of efficiency.

For the situation, too, in which, during the passage of a cloud, the collector line is heated differently, the system as a whole can still be operated with very high efficiency. The intervention of a facility, which in case of necessity would "rotate" individual collectors out of the direct solar radiation in order to protect the system, can be restricted to a minimum with this conceptional implementation of the supply water control.

By means of the mass flow signal generated on the basis of a precontrol, enthalpy fluctuations and temperature fluctuations respectively at the evaporator output can be kept within moderate limits, even with highly non-stationary operational situations. As well as a material-conserving mode of operation, this effect likewise has an extremely favorable effect on the live steam temperature and its control, such that, over a wide operating range, the turbine inlet is subjected to only minor temperature fluctuations.

BRIEF DESCRIPTION OF THE DRAWINGS

FIG. 1 a diagrammatic representation of a directly heated solar-thermal steam generator 3 with supply water flow control for stationary operation.

FIG. 2 a diagrammatic representation of a directly heated solar-thermal steam generator 3 for non-stationary operation with predictive supply water nominal value determination.

FIG. 3 a diagrammatic representation of a directly heated solar-thermal steam generator 3 for non-stationary operation with a further developed predictive supply water nominal value determination.

FIG. 4 a diagrammatic representation with a further development of a directly heated solar-thermal steam generator 3 with predictive supply water nominal value determination, taking account of additional economizer heating surfaces.

DETAILED DESCRIPTION OF INVENTION

Figure 1:
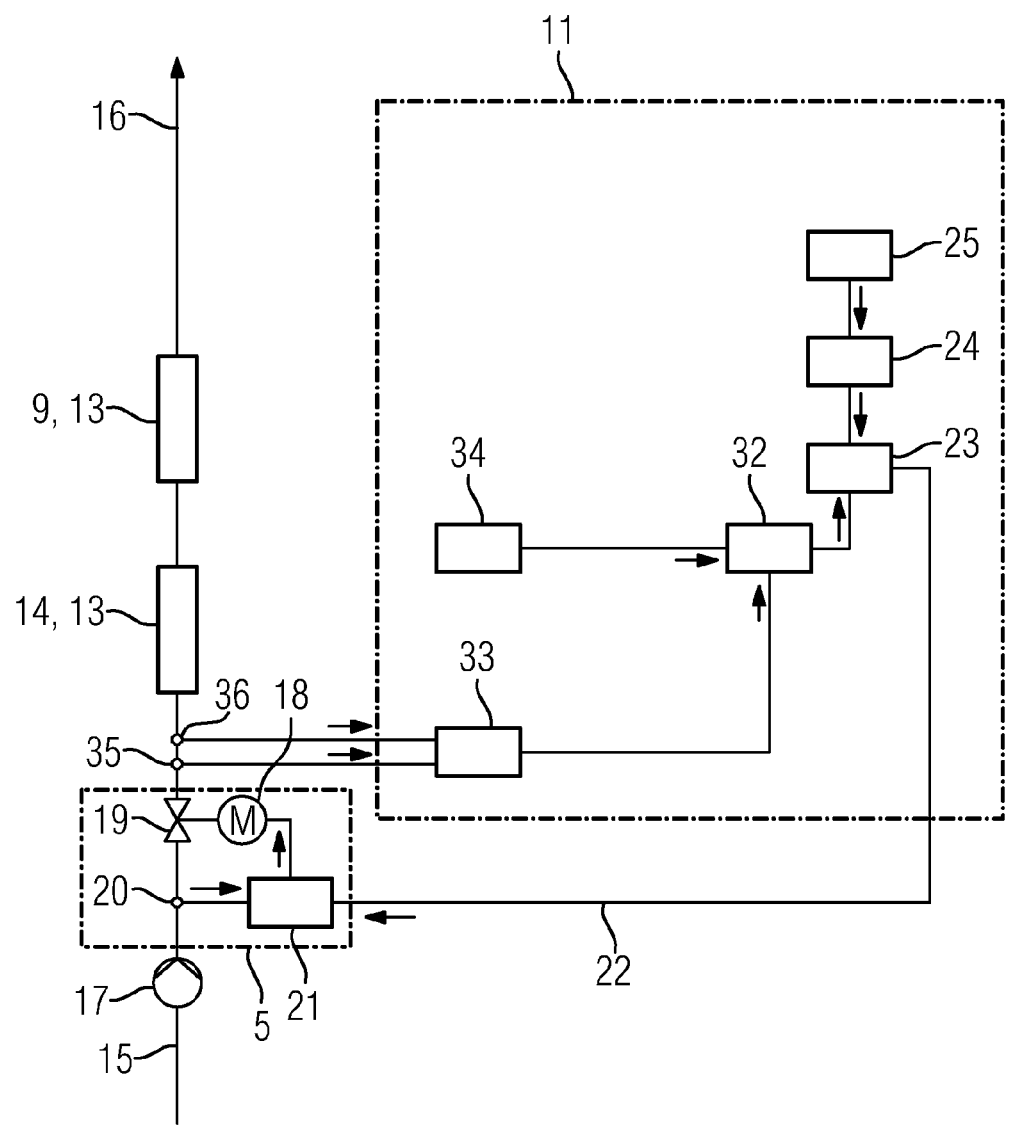
In FIGS. 1 to 4 exemplary embodiments of the invention are explained in greater detail. These show.

FIG. 1 shows a diagrammatic control circuit diagram of a supply water nominal value determination for the stationary operation of a solar-thermal steam generator 3 in a parabolic trough power plant 1. The parabolic trough power plant 1 is not represented in any greater detail. The solar-thermal steam generator is only diagrammatically represented. Solar-thermal steam generators comprise as a rule a number of parabolic trough collectors 13 (or Fresnel collectors respectively), which can be used as evaporator collectors 14, as superheater collectors 9, or as economizer collectors 10. The solar-thermal steam generator 3 represented in FIG. 1 comprises only evaporator collectors 14 and superheater collectors 9. The evaporator collectors 14 are connected to a supply water delivery line 15 for the conducting of supply water.

The solar-thermal steam generator 3 represented in FIG. 1 is additionally in forced-flow operation, in which the supply water is entirely evaporated in the evaporator collectors 13 by solar-thermal direct heating, and is then superheated.

The solar-thermal steam generator 3 is designed for a controlled application of supply water. For this purpose, a supply water pump 17 is connected into the supply water delivery line 15. A choke valve 19 is also connected into the supply water delivery line 15, which is actuated by a servomotor 18. The choke valve 19 and servomotor 18 are integral parts of an apparatus for adjusting the supply water mass flow 5, which also still includes a control element 21, which is provided to activate the servomotor 18, and a measuring facility 20, which determines the supply water mass flow $\dot{M}$ in the supply water delivery line 15. The control element 21 is subjected on the input side to a nominal value $\dot{M}_s$ supplied by way of a data line 22 for the supply water mass flow $\dot{M}$ and is subjected to the current actual value of the supply water mass flow $\dot{M}$ determined by way of the measuring facility 20. By differentiating between these two signals, a tracking requirement is conveyed so that when deviating the actual value from the nominal value, a corresponding tracking of the choke value 19 takes place by activating the motor 18.

For the determination of a nominal value $\dot{M}_s$ for the supply water mass flow $\dot{M}$, the data line 22 is connected on the input side to the supply water flow control 11, which is configured to specify the nominal value $\dot{M}_s$ for the supply water mass flow $\dot{M}$.

The nominal value $\dot{M}_s$ is determined on the basis of a heat flow balance of the evaporator of the solar-thermal steam generator 3, by way of the ratio of the heat flow currently being transferred into the evaporator of the solar-thermal steam generator 3 and onto the supply water on the one hand, and, on the other, a nominal increase in the enthalpy which is desired with regard to the specified enthalpy nominal value at the evaporator outlet. For the provision of the nominal value $\dot{M}_s$, the supply water flow control 11 exhibits a divider element 23.

The counter is provided to the divider element 23 from a function module 24. The function module 24 determines the heat output Q transferred into the evaporator heating surface of the solar-thermal steam generator 3 or to the evaporator collector field. For this purpose each evaporator collector 14 of the solar-thermal steam generator 3 is equipped with an appropriate measuring facility. The measured data from the individual evaporator collectors 14 is summated in a function module 25, and, due to the non-stationary heat conduction into the tube walls, is temporally slightly delayed by means, for example, of a PT3 element.

As the denominator, the heat-up range or, respectively, the enthalpy difference of the flow medium in the evaporator collectors 14 is fed to the divider element 23. The enthalpy difference is formed from the enthalpy nominal value at the output of the evaporator collectors 14 and the present enthalpy at the input of the evaporator collectors 14, which is determined by conversion by way of the measured values of pressure and temperature. The actual value of the present enthalpy of the supply water before input into the solar-thermal steam generator 3 is determined by an evaluation unit 33, and transferred to the function module 33. To determine measured data, the evaluation unit 33 is connected to a pressure measuring apparatus 35 and a temperature measuring apparatus 36, both of which are in each case connected into the supply water delivery line 15.

The nominal enthalpy at the output of the evaporator of the solar-thermal steam generator 3 is selected as a function of the state of the system and the evaporator design, and specified as a nominal value. The nominal enthalpy is fed to the function module 32 via a signal transmitter 34. By differentiation in the function module 32, the increase in enthalpy of the flow medium, required as a function of the desired evaporator output state, is determined in the evaporator of the solar-thermal steam generator 3, and then used as a denominator in the divider element 23. The divider element 23 calculates from this the required mass flow signal.

Figure 2:
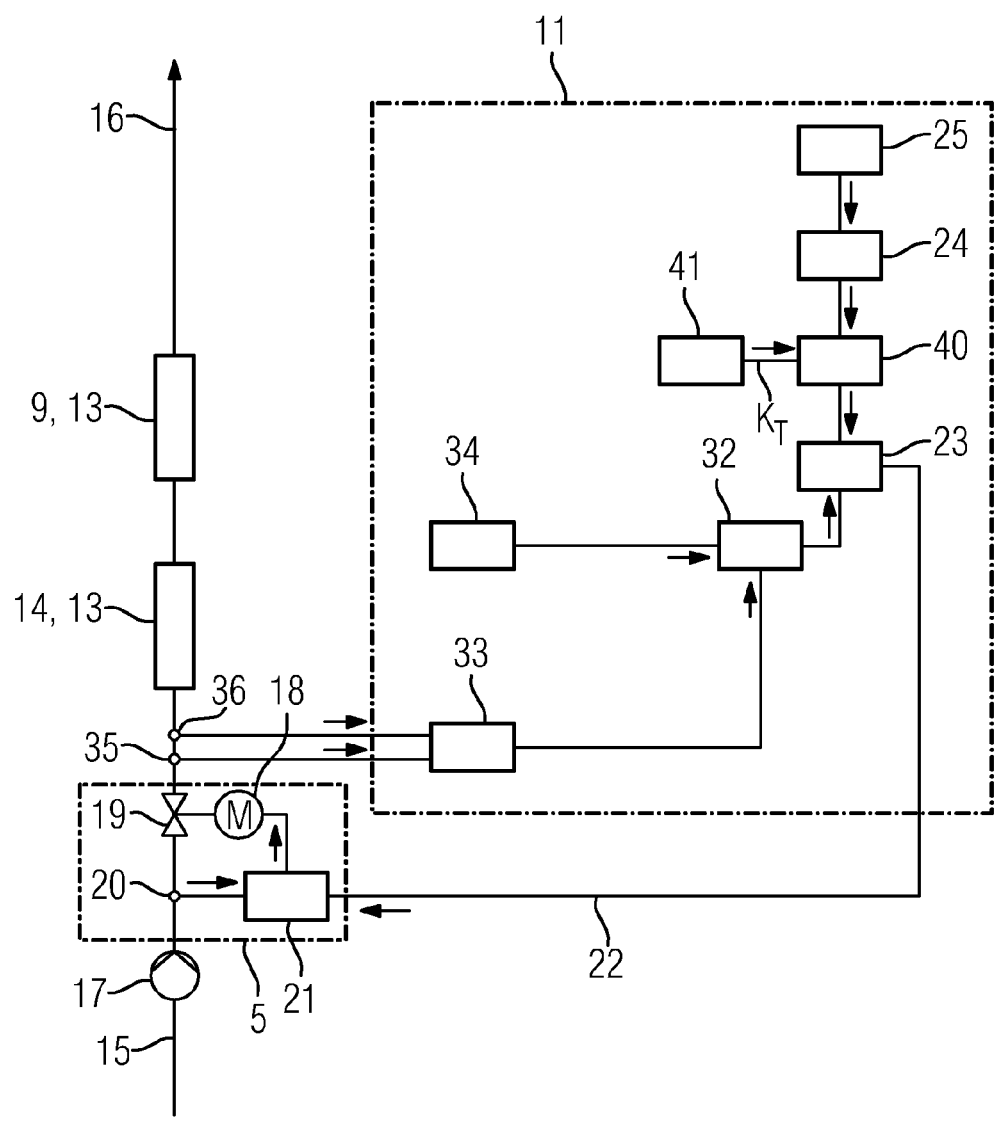

As an extension to FIG. 1, FIG. 2 shows a control circuit diagram of a directly heated solar-thermal steam generator 3 with predictive supply water nominal value determination for non-stationary operation.

With non-stationary processes, thermodynamic state values in the steam generator generally change, such as, for example, the live steam temperature, the pressure (and accordingly, in sub-critical cases, also the boiling temperature of the flow medium), and the supply water temperature. As a result of these changes, the material temperature of the steam generator tubes is also not constant, and becomes greater or smaller depending on the direction. Consequently, thermal energy is stored in the tube walls or withdrawn from the tube walls. Compared with the balanced heat of the thermal oil, depending on the direction of the material temperature change, there is accordingly more or less heat temporarily available for the steam generation process of the flow medium. This can likewise be observed for systems with both sub-critical as well as above-critical steam parameters.

Accordingly, with a predetermined enthalpy nominal value at the evaporator output of the solar-thermal steam generator 3, for the advance calculation of the supply water mass flow required this not insubstantial influence must inevitably be taken into account in the control circuit. According to the invention, this is effected by a correction value $K_T$. The correction value $K_T$ is a characteristic heat flow variable by means of which the evaporation tube storage and withdrawal effects can be determined equally for sub-critical as well as for above-critical systems.

In order to take account of the correction value $K_T$, provision is made in FIG. 2, as an extension to FIG. 1, for a subtractor element 40, which is connected between the function module 24 and the divider element 23. The differentiator element 40 forms the difference from the heat output Q (total heat absorption) introduced into the evaporator, which is provided by the function module 24, and the correction value $K_T$, and forwards the result, as the corrected introduced heat output $Q_{Korr}$, to the divider element 23.

The correction value $K_T$ is provided to the subtractor element 40 by a differentiator element 41. For the differentiator element 41, as the input signal, a mean material temperature of all the evaporator tubes is to be defined and used. In this case, for example, the mean material temperature can be determined by way of the values known from the process, the live steam temperature system pressure, and supply water temperature. If this mean material temperature now changes, and if this temporal change (assessed by the differentiator element 41) is multiplied by the mass of the whole of the steam generator tubes and the specific heat capacity of the evaporator material, the heat quantities stored in and withdrawn from the tube wall can be quantified in the form of the correction value $K_T$. By the selection of a suitable time constant of the differentiator element 41, the temporal behavior of the described storage effects can be recreated relatively precisely, such that this additional effect of the storage and withdrawal of heat from the metal masses, based on non-stationary processes, can be calculated directly.

Figure 3:
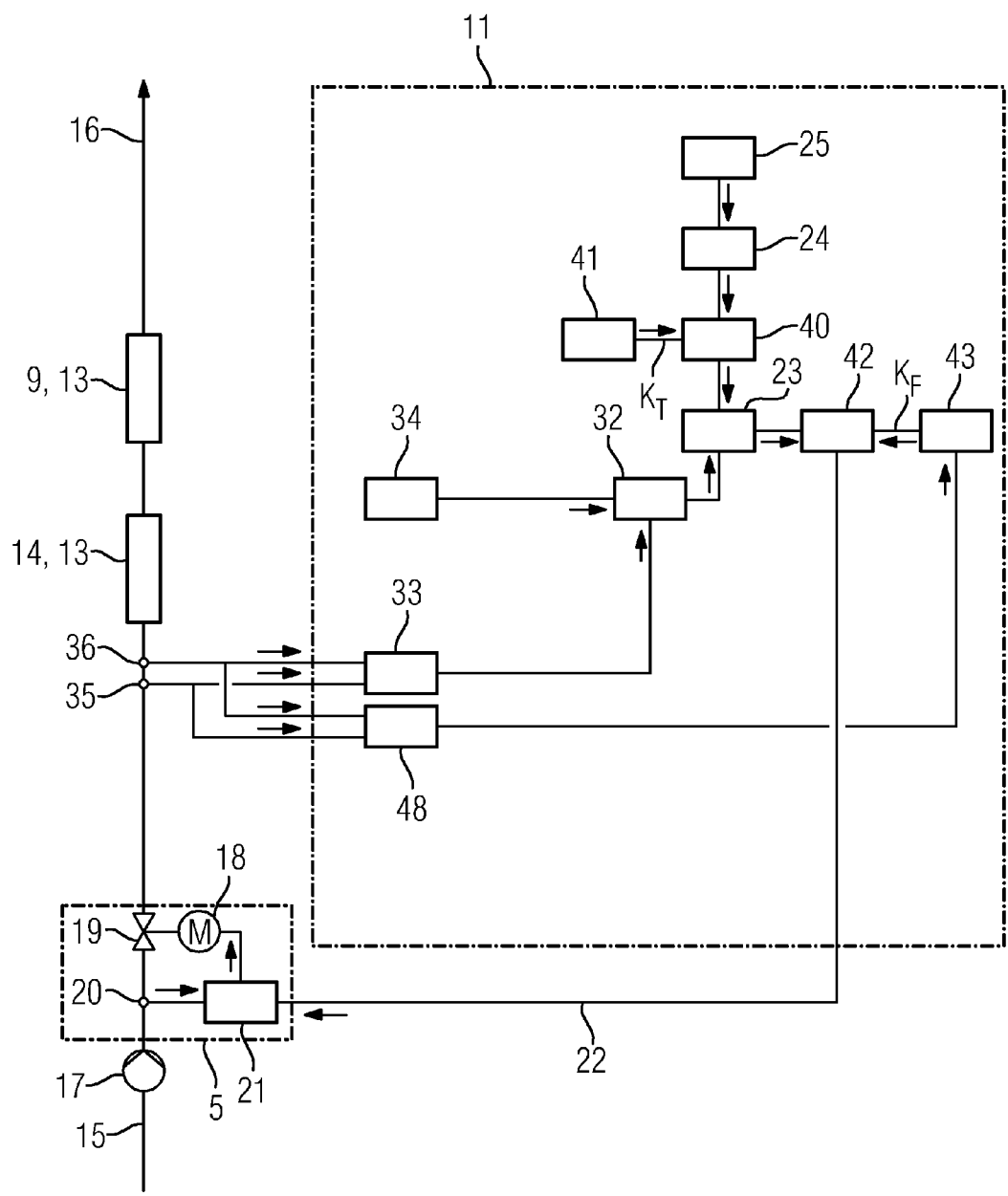

FIG. 3 shows a diagrammatic representation of a directly heated solar-thermal steam generator 3 in a further development from FIG. 2, with the additional consideration of the correction value $K_F$.

Disturbances to the supply water temperature at the input of the evaporator of the solar-thermal steam generator 3 have a decisive effect on its throughflow. Specifically, this means that, as the supply water temperature falls, the specific volume of the flow medium in the input area of the evaporator of the solar-thermal steam generator 3 decreases. Due to this process, additional supply water is required, which must top up the volume of the evaporator tubes which is now not exhausted. Consequently, supply water is stored. By contrast, if the supply water temperature rises, the inverse mechanism takes place.

If, as a result of non-stationary processes, the supply water temperature at the input of the evaporator of the solar-thermal steam generator is now subjected to changes, then, with the resultant fluid-side storage and withdrawal processes, the input and output mass flows of the evaporator of the solar-thermal steam generator 3 are not identical. This has an immediate affect on the evaporator output enthalpy, which, under these circumstances, cannot remain constant, even if the heat input is constant. Accordingly, the effects of fluctuating supply water temperatures at the input of the evaporator of the solar-thermal steam generator 3 are likewise compensated by countermeasures of the supply water nominal value determination (increasing or decreasing of the supply water mass flow). This is effected by the correction value $K_F$.

Taking FIG. 2 as a basis, further represented in FIG. 3 is an adder element 42, which is connected into the data line 22 and corrects the nominal value $\dot{M}_s$ by the correction value $K_F$. The correction value $K_F$ is conducted to the adder element 42 via a differentiator element 43. The differentiator element 43 takes into consideration data such as, for example, input under-cooling of the evaporator, input enthalpy of the evaporator, or the supply water temperature itself. The differentiator element 43 is parameterized with an appropriate time constant and a suitable amplification, in order to effectively reduce the enthalpy fluctuations at the evaporator output of the solar-thermal steam generator 3. In this situation, the differentiator element 43 receives on the input side, for example, the input under-cooling from the evaluation unit 48. The evaluation unit 48 is connected to the pressure measuring apparatus 35 and the temperature measuring apparatus 36, which are already supplying the evaluation unit 33 with measured data.

Figure 4:
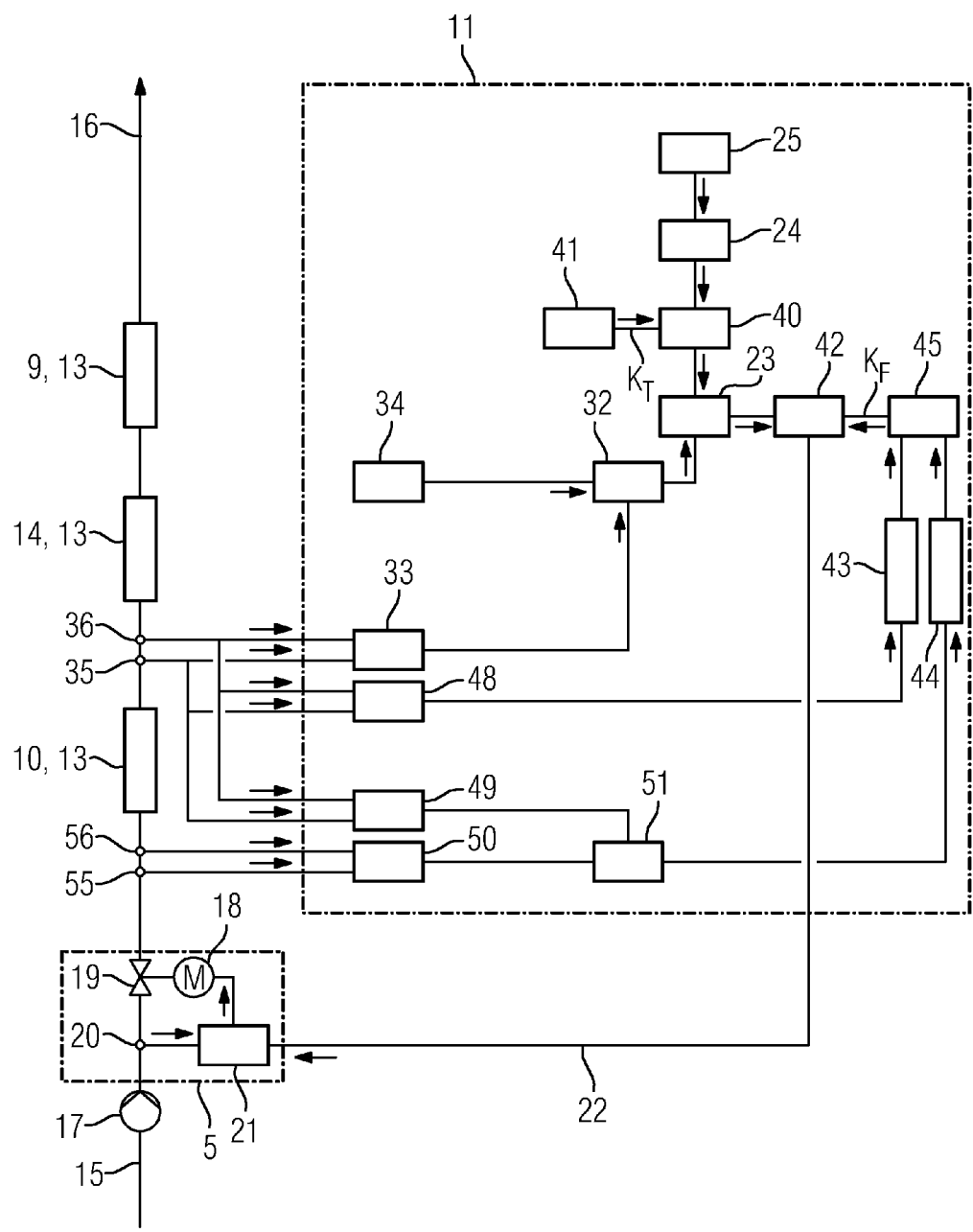

FIG. 4 shows, in comparison with FIG. 3, an extended circuit arrangement of the solar-thermal steam generator 3, with additional economizer collectors 10.

In order, also with transient processes, to correct the fluid-side storage and withdrawal effects of the parabolic trough collectors 13 used as economizers, a determination of the densities of the flow medium at the input and output of the parabolic trough collectors 13 used as economizers is to be performed. To do this, as well as the differentiator element 43, which corrects the fluid-side storage and withdrawal effects of the evaporator collectors 14, a further differentiator element 44 is provided, by which the fluid-side storage and withdrawal effects of the economizer collectors 10 are corrected. The signals from the differentiator element 43 and the differentiator element 44 are superimposed in an adder element 45, and this sum of both the individual signals forms the correction factor $K_F$.

The differentiator element 44 in this situation is connected on the input side to a function element 51, in which a mean density of the fluid is determined. To do this, the density of the fluid at the input of the first economizer collector 10 is conducted to the function element 51 via a function module 49, and the density of the fluid at the output of the last economizer collector 10 via a function module 50. The function module 49 is connected for this purpose to a pressure measuring apparatus 55 and a temperature measuring apparatus 56, which are connected into the supply water delivery line 15 upstream of the input of the first economizer collector 10. The function module 50 is connected to the pressure measuring apparatus 35 and the temperature measuring apparatus 36, which are already supplying the evaluation unit 33 with measured data.

The function module 49 and the function module 50 calculate from the pressure and temperature information the fluid densities at the respective measuring points. The function element 51 calculates, by means of a suitable conversion process, a representative density mean value. A change in this density mean value is inevitably an indicator of fluid-side storage and withdrawal effects of the economizer collectors 10. This density mean value is therefore formed in the function element 51, and quantitatively acquired by the differentiator element 44. If a suitable amplification and a suitable time constant are selected for this differentiator element 44, the correction signal generated in this way compensates optimally for the fluid-side storage effects in the economizer. For amplification purposes, use is preferentially made of the complete volume of the economizer collector tubes. As a time constant, use is preferably made of half the passage time of the flow medium through the economizer collectors 10, although this is to be selected in a load-dependent manner.

In addition to a greater stability of the control, this measure also contributes to increasing the quality of control. In this situation, however, account must be taken of the fact that, for the circuit variant in FIG. 4, an adequate input under-cooling must be guaranteed between the economizer collectors 10 and the evaporator collectors 14, in order for the temperature measuring apparatus 36 to be able to supply a valid and evaluatable measurement signal.

The invention claimed is:

1. A directly heated solar-thermal steam generator, comprising:
   a control element for adjusting the supply water mass flow $\dot{M}$, which is conducted on the basis of a nominal value $\dot{M}_s$ for the supply water mass flow $\dot{M}$, wherein the nominal value $\dot{M}_s$ is determined by a heat flow balance of an evaporator, wherein the heat flow balance is a ratio of the heat flow transferred into the evaporator and a nominal increase in enthalpy desired with respect to a specified enthalpy nominal value at the evaporator outlet;
   wherein an associated supply water flow control is configured for adjusting the nominal value $\dot{M}_s$ by taking into account a correction value $K_T$, by which the thermal effects of storage or withdrawal of thermal energy in an evaporator are corrected; and
   wherein a correction value $K_F$ is further taken into account, by which fluid quantities stored in or withdrawn from the evaporator tubes are further corrected, wherein $K_F$ is determined by fluid-side stored or withdrawn fluid quantities in the evaporator of the solar-thermal steam generator, or from a sum of fluid-side stored or withdrawn fluid quantities in the evaporator and economizer.

2. The directly heated solar-thermal steam generator as claimed in claim 1, comprising a number of parabolic troughs, which can be subjected directly due to focused solar incidence.

3. A solar-thermal parabolic trough power plant with a directly heated solar-thermal steam generator as claimed in claim 1.

4. A method for operating a directly heated, solar-thermal steam generator, comprising:
   conducting a nominal value $\dot{M}_s$ for the supply water mass flow $\dot{M}$ to a control element for adjusting the supply water mass flow $\dot{M}$, wherein the nominal value $\dot{M}_s$ is determined by a heat flow balance of an evaporator, wherein the heat flow balance is a ratio of the heat flow transferred into the evaporator and a nominal increase in enthalpy desired with respect to a specified enthalpy nominal value at the evaporator outlet;
   adjusting the supply water mass flow $\dot{M}$ using the nominal value $\dot{M}_s$, wherein, the nominal value $\dot{M}_s$ for the supply water mass flow $\dot{M}$, further takes into account a correction value $K_T$, by which the thermal effects of storage or withdrawal of thermal energy in an evaporator are corrected; and wherein a correction value $K_F$ is further taken into account, by which fluid quantities stored in or withdrawn from the evaporator tubes are further corrected, wherein $K_F$ is determined by fluid-side stored or withdrawn fluid quantities in the evaporator of the solar-thermal steam generator, or from a sum of fluid-side stored or withdrawn fluid quantities in the evaporator and economizer.

5. The method as claimed in claim 4, wherein thermal storage effects of thermal energy stored into or withdrawn from the tube walls of the evaporator of the solar-thermal generator are corrected by the correction value $K_T$.

6. The method as claimed in claim 4, wherein the fluid quantities stored in or withdrawn from an economizer upstream of the evaporator are further corrected by a correction value $K_F$.

7. The method as claimed in claim 4, wherein the correction value $K_F$ is determined by making use of the supply water intake under-cooling or the supply water intake enthalpy or the supply water temperature or the supply water density.

8. The method as claimed in claim 4, wherein the solar-thermal steam generator comprises a plurality of parabolic troughs, in which supply water is evaporated directly by solar thermal means.

* * * * *